(12) United States Patent
Rodriguez Bravo et al.

(10) Patent No.: US 11,086,996 B2
(45) Date of Patent: Aug. 10, 2021

(54) AUTOMATIC IDLE-STATE SCANNING FOR MALICIOUS CODE

(71) Applicant: International Business Machines Corporation, Armonk, NY (US)

(72) Inventors: Cesar Augusto Rodriguez Bravo, Alajuela (CR); David Jaramillo, Durham, NC (US); Romelia H. Flores, Keller, TX (US); Gregory J. Boss, Saginaw, MI (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 16/382,515

(22) Filed: Apr. 12, 2019

(65) Prior Publication Data
US 2020/0327228 A1    Oct. 15, 2020

(51) Int. Cl.
*G06F 21/00*    (2013.01)
*G06F 21/56*    (2013.01)
*G05D 1/02*    (2020.01)

(52) U.S. Cl.
CPC ............ *G06F 21/566* (2013.01); *G05D 1/02* (2013.01); *G06F 2221/034* (2013.01)

(58) Field of Classification Search
CPC .... G06F 21/566; G06F 2221/034; G05D 1/02
See application file for complete search history.

(56) References Cited

U.S. PATENT DOCUMENTS

| 7,272,493 B1* | 9/2007 | Hamrick ............... H04W 4/029 701/517 |
| 8,126,642 B2 | 2/2012 | Trepagnier et al. |
| 8,392,065 B2 | 3/2013 | Tolstedt et al. |
| 8,781,669 B1 | 7/2014 | Teller et al. |
| 9,195,232 B1 | 11/2015 | Egnor et al. |
| 9,278,689 B1 | 3/2016 | Delp |
| 9,368,026 B1 | 6/2016 | Herbach et al. |

(Continued)

FOREIGN PATENT DOCUMENTS

| DE | 102011115223 A1 | 3/2013 |
| WO | 2017018743 A1 | 2/2017 |

OTHER PUBLICATIONS

Bezemskij et al., "Behaviour-based anomaly detection of cyber-physical attacks on a robotic vehicle," Department of Computing & Information Systems, University of Greenwich, London, United Kingdom, Printed Jan. 10, 2019, 8 Pages.

(Continued)

*Primary Examiner* — Kendall Dolly
*Assistant Examiner* — Michael M Lee
(74) *Attorney, Agent, or Firm* — Jamar K. Ray

(57) ABSTRACT

A computer-implemented method may include obtaining a predicted idle-state duration of a first device. The computer-implemented method may further include obtaining a value corresponding to an available processing capacity of the first device. The computer-implemented method may further include making a first determination that the predicted idle-state duration of the first device exceeds a time required to perform a security scan of the first device using the available processing capacity of the first device. The computer-implemented method may further include making a second determination to perform a security scan of the first device in response to the first determination.

13 Claims, 6 Drawing Sheets

(56) References Cited

U.S. PATENT DOCUMENTS

| | | | |
|---|---|---|---|
| 9,524,648 | B1 | 12/2016 | Gopalakrishnan et al. |
| 9,567,007 | B2 | 2/2017 | Cudak et al. |
| 9,646,428 | B1 | 5/2017 | Konrardy et al. |
| 9,720,410 | B2 | 8/2017 | Fairfield et al. |
| 2009/0327688 | A1* | 12/2009 | Li .................. G06F 21/566 713/100 |
| 2014/0358353 | A1 | 12/2014 | Ibanez-Guzman et al. |
| 2015/0033340 | A1* | 1/2015 | Giokas ............ H04L 63/1441 726/23 |
| 2015/0271208 | A1 | 9/2015 | Gallant et al. |
| 2016/0132680 | A1* | 5/2016 | Rodniansky ........... G06F 21/57 726/22 |
| 2016/0366100 | A1* | 12/2016 | Liu ................... G06F 9/45504 |
| 2017/0160748 | A1* | 6/2017 | Nakagawaa ............ G05D 1/00 |
| 2019/0111917 | A1* | 4/2019 | Kim ................. G07C 5/008 |
| 2020/0012529 | A1* | 1/2020 | Jimbo ................. G06F 21/56 |

OTHER PUBLICATIONS

Zhang et al., "Defending Connected Vehicles Against Malware: Challenges and a Solution Framework," IEEE Internet of Things Journal, vol. 1, No. 1, Feb. 2014, pp. 10-21.

Petit et al., "Potential Cyberattacks on Automated Vehicles," IEEE Transactions on Intelligent Transportation Systems, 2014, DOI: 10.1109/TITS.2014.2342271, 11 Pages.

Garret, "10 Million Self-Driving Cars Will Hit The Road By 2020—Here's How To Profit," Forbes, Mar. 3, 2017, 9 pages, https://www.forbes.com/sites/oliviergarret/2017/03/03/10-million-self-driving-cars-will-hit-the-road-by-2020-heres-how-to-profit/#3ede7d0f7e50.

Mell et al., "The NIST Definition of Cloud Computing," Recommendations of the National Institute of Standards and Technology, U.S. Department of Commerce, Special Publication 800-145, Sep. 2011, 7 pages.

\* cited by examiner

AUTOMATIC IDLE-STATE SCANNING FOR MALICIOUS CODE

BACKGROUND

The present disclosure relates to protecting devices from malicious code, and more specifically, to detecting malicious code on devices.

Devices may be susceptible to the installation of malicious code. Tools may be configured to facilitate the detection of such malicious code.

SUMMARY

Some embodiments of the present disclosure can be illustrated as a computer-implemented method comprising obtaining a predicted idle-state duration of a first device. The computer-implemented method may further include obtaining a threshold time required to perform a security scan of the first device. The computer-implemented method may further include making a first determination that the predicted idle-state duration of the first device exceeds the threshold time. The computer-implemented method may further include obtaining a value corresponding to an available processing capacity of the first device. The computer-implemented method may further include obtaining a processing threshold value corresponding to a processing capacity necessary to perform a security scan within the threshold time. The computer-implemented method may further include making a second determination that the value corresponding to an available processing capacity of the device exceeds the processing threshold value. The computer-implemented method may further include making a third determination to perform a security scan of the first device in response to the first determination and in response to the second determination.

Some embodiments of the present disclosure can be illustrated as a computer program product. The computer program product may comprise a computer readable storage medium having program instructions embodied therewith. The program instructions may be executable by a computer to cause the computer to obtain a location of a first device. The program instructions may also cause the computer to obtain a location of a second device. The program instructions may also cause the computer to make a first determination that the second device is located within a threshold distance of the first device. The program instructions may also cause the computer to obtain a threshold time required to perform a security scan of the first device. The program instructions may also cause the computer to obtain an idle state duration of the second device. The program instructions may also cause the computer to make a second determination that the idle state duration of the second device exceeds the threshold time. The program instructions may also cause the computer to make a third determination to perform a security scan of the first device in response to the first determination and in response to the second determination.

Some embodiments of the present disclosure can be illustrated as a system comprising a processor. The system may also include a memory in communication with the processor. The memory may contain program instructions that when executed by the processor are configured to cause the processor to perform a method. The method may comprise obtaining a predicted idle state duration of a first device. The method may also comprise obtaining a value corresponding to an available processing capacity of the first device. The method may also include making a first determination that the predicted idle state duration of the first device exceeds a time required to perform a security scan of the first device using the available processing capacity of the first device. The method may also include making a second determination to perform a security scan of the first device. The second determination may be in response to the first determination.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
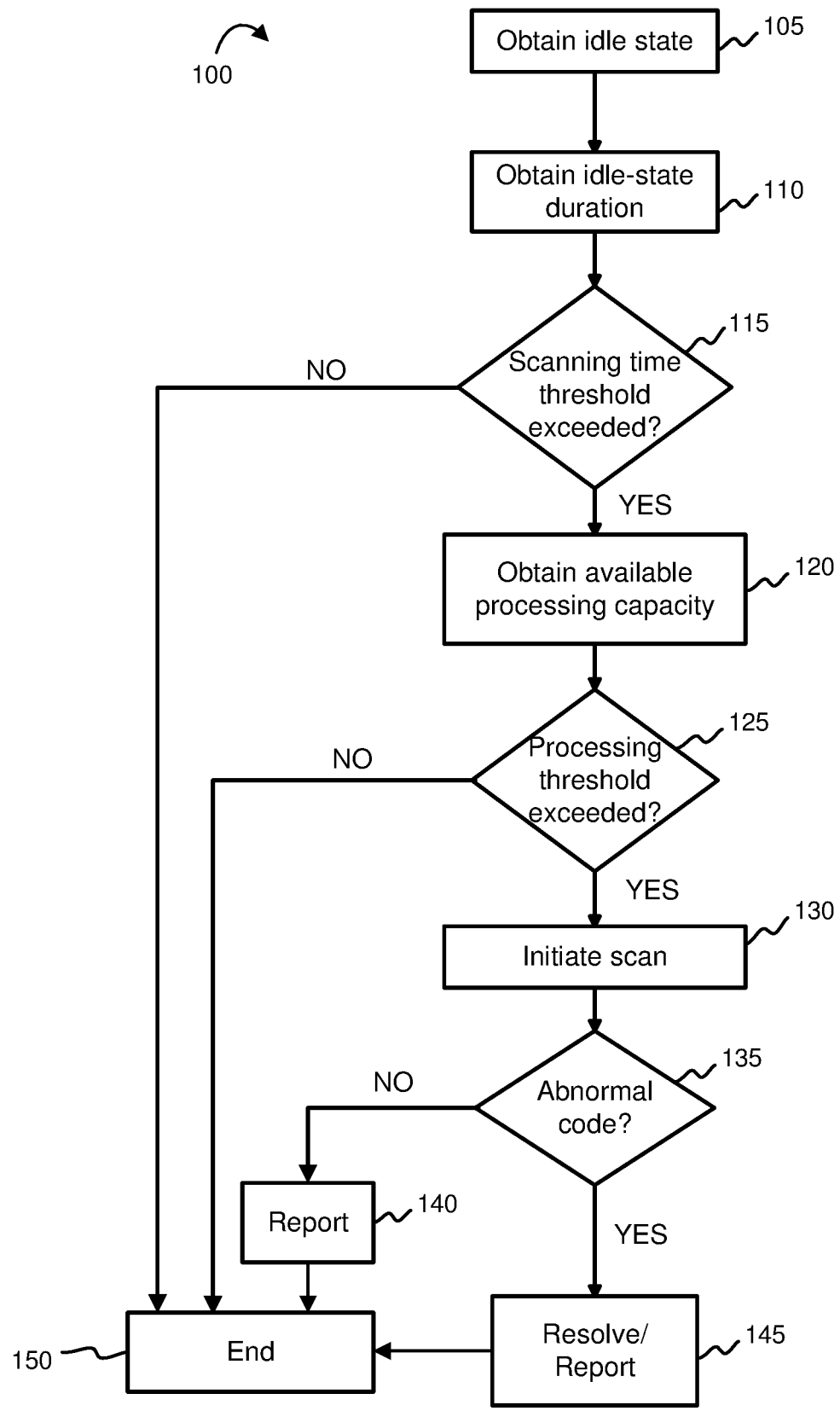
FIG. 1 depicts a flowchart of an example method for identifying malicious code, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to detecting malicious code, more particular aspects relate to automatic management of malicious code detection processes. While the present disclosure is not necessarily limited to such applications, various aspects of the disclosure may be appreciated through a discussion of various examples using this context.

Devices such as vehicles, particularly autonomous vehicles, and "Internet of Things" ("IoT") devices (e.g. cameras, smart TVs, smart appliances, and wearables) may include computing systems that are susceptible to malicious computing attacks. Malicious computing attacks may include installing or removing programming code from a device's computing system. Some malicious computing attacks, referred to as active attacks, may cause immediate disruption to the functionality of a device, such as causing a device to immediately power off. Other malicious computing attacks, referred to as passive attacks, may initiate covert, nondisruptive activity (e.g., an affected camera may operate with normal functionality but may also transmit data to an unauthorized source specified by the malicious code). Other malicious computing attacks may include active and passive characteristics, such that the malicious code causes delayed disruptive activity after it is installed. For example, a particular attack, referred to as a "logic bomb," may include installing, onto a computing system, malicious code that may be activated at a later time when particular conditions are satisfied. Malicious computing attacks may cause a device to relinquish one or more functionalities, and in the case of a vehicle, such attacks may create a hazardous driving condition.

Discovering a malicious computing attack on a device's computing system may present unique challenges. For example, during the time a device is operated, the device's computing system may have insufficient available processing capacity to perform a security scan to detect programming code abnormalities. Furthermore, performing such a security scan during the time the device is operated may overburden the device's computing system and cause the device to shut down or malfunction. This result may be particularly dangerous when the device is an operating vehicle. Since a device, such as a vehicle, may be operated at varied times and for inconsistent time periods according to a user's needs, configuring frequent security scans may be difficult.

To address these and other problems, embodiments of the present disclosure include a malicious code detection system and method that may autonomously determine when a device may simultaneously be in an idle state and have sufficient processing capacity to perform a security scan to detect programming code abnormalities. The system may then implement methods to perform an efficient security scan for such abnormalities. Thus, embodiments of the present disclosure may provide automatic, intermittent scans for programming code abnormalities that may correspond with periods of non-operation of a device. Accordingly, embodiments of the present invention may provide improved protection against malicious computing attacks by providing intermittent security scans that may not interfere with a device's periods of operation.

Embodiments of the present disclosure include a malicious code detection system ("detection system") that may predict an idle-state duration of a device. The idle-state duration of a device may indicate a time period during which the device is not being used for its primary function (e.g., a time period during which a vehicle is parked instead of being used for transportation or a time period during which a camera is not capturing or processing an image). Embodiments of the present disclosure may automatically initiate a security scan during a device's idle-state duration.

In some embodiments, the prediction of an idle-state duration may be based on a variety of data inputs, such as location data, historical use data, calendar data, and/or data from one or more devices. Such data inputs may be obtained and analyzed by a processor included with the detection system.

In some embodiments, the detection system may estimate a threshold time that is required to perform a security scan and ensure that the idle-state duration exceeds the threshold time. By doing this, the detection system may ensure that the security scan can be completed if the security scan is initiated.

In some embodiments, the detection system may obtain a value corresponding to a device's available processing capacity and compare that value to a threshold processing capacity required to perform a security scan. By doing this, the detection system may ensure that sufficient processing resources are available for performing the security scan.

In some embodiments, the detection system may initiate a security scan by searching for a nearby reference device that may provide a reference programming code that may be compared to a programming code of the device undergoing the security scan. By doing this, the detection system may reduce the time and/or the resources that may be required to detect programming code abnormalities.

Turning to the figures, FIG. 1 illustrates an example method 100 for identifying malicious code, in accordance with embodiments of the present disclosure. In this disclosure, "obtaining" information may refer to collecting data and determining the information from the collected data or it may refer to receiving the information from a source. In step 105, the detection system may obtain the idle state of a device, such as a camera or a vehicle. Step 105 may include a processor of the detection system receiving an output from the device that indicates the device has an idle state. For example, in some embodiments, a computing system of a vehicle whose ignition has been turned off may emit a signal indicating that the vehicle has been parked and has entered an idle state. The signal may be received by a processor of the detection system. In some embodiments, a computing system of a facial recognition camera that permits access to a building may emit a signal indicating that no facial recognition analysis is currently being performed. Such a signal may be received by a processor of the detection system and may indicate an idle state of the facial recognition camera.

In step 110, the detection system may obtain a predicted idle-state duration of the device so that the detection system may determine whether the idle-state duration is a sufficient period of time to complete a security scan. Step 110 may include acquiring data from one or more sources and analyzing the data using algorithms and/or machine learning correlations to predict the idle-state duration.

For example, in some embodiments, the detection system may obtain location data from a GPS system of a vehicle and determine that the vehicle is parked in an office parking lot. The detection system may additionally obtain historical data from a storage device of a vehicle computing system that indicates the vehicle regularly remains at the office parking lot for 7 hours on weekdays and for less than one hour on weekends. The detection system may also obtain calendar data from the vehicle computing system; the calendar data may indicate that the current time is 12 PM on a Saturday. From this data, the detection system may predict that the idle-state duration of the vehicle will be less than one hour.

In another example, in some embodiments, the detection system may obtain historical data from a computing system of a facial recognition camera that permits access to a building. By analyzing such historical data of the camera's activity, the detection system may recognize a trend that the camera regularly performs a large number of facial analyses between 7 AM and 10 AM, followed by a period of low activity between 10 AM and 10:45 AM. The detection system may additionally obtain a current time of 10:15 AM from a processor within the camera. From this data, the detection system may predict that the idle-state duration of the camera will be approximately 30 minutes.

In step 115, the detection system may compare the idle-state duration to a predetermined scanning-time threshold. The scanning-time threshold may be an estimate by the detection system of the time required to perform a security scan of a device's programming code. In some embodiments, a processor of the detection system may estimate the scanning-time threshold according to factors such as the size of a device's programming code and the speed of a processor of the detection system. If the idle-state duration does not exceed the scanning-time threshold in step 115, then the detection system may not have a sufficient amount of time to complete a security scan; thus, the detection system may proceed to step 150 and end the process. However, if the idle-state duration does exceed the scanning-time threshold in step 115, then the detection system may proceed to step 120.

In step 120, the detection system may obtain a value corresponding to a device's available processing capacity for performing a security scan. For example, in some embodiments, an autonomous vehicle may be parked while an occupant remains in the vehicle to continue using a vehicle function (e.g., an occupant continues listening to a radio broadcast, continues using a vehicle computer interface, or continues participating in a phone conversation using a vehicle's hands-free communication technology). The use of such vehicle functions may reduce the vehicle's processing capacity for performing a security scan from a value such as 95% to a value such as 80%.

In step 125, the detection system may compare the value corresponding to the device's processing capacity with a predetermined processing threshold value. The processing threshold value may be an estimate by the detection system of a processing capacity required to complete a security scan of a device's programming code within a time period, such as within the scanning-time threshold.

Continuing with the example above, the detection system may have estimated a scanning-time threshold of two hours based on a processing threshold value of 90%. If the occupant utilizes one or more vehicle functions that reduce the vehicle's processing capacity to 80%, then the detection system may not have a sufficient processing capacity to complete the security scan within the scanning-time threshold; thus, the detection system may proceed to step 150 and end the process. However, if an occupant's use of vehicle functions allows the device's processing capacity to exceed the 90% processing threshold value, then the detection system may proceed to step 130.

In some embodiments, instead of performing the comparisons in steps 115 and 125, the system may compare the obtained predicted idle-state duration to a time required to perform a security scan of the device's programming code using the available processing capacity of the device. For example, if the obtained predicted idle-state duration is 30 minutes and the device's available processing capacity is 75%, then the system may compare the 30-minute idle-state duration to a time by which a security scan may be completed using a 75% processing capacity.

In step 130, the detection system may initiate a security scan of the device's programming code. In some embodiments, such a security scan may include methods presented in FIG. 2. Step 130 may include comparing each line of the device's programming code to a reference programming code to detect any programming expressions that are present in the device's programming code but are not present in the reference programming code, as well as to detect any programming expressions that are not present in the device's programming code but are present in the reference programming code. Either of those conditions may indicate a malicious computing attack. Step 130 may also include alerting an entity that a security scan is being initiated (e.g., the detection system may be configured to notify a vehicle owner by an email or text message that a security scan is being initiated).

In step 135, the detection system may determine if the security scan detected abnormal code, or discrepancies between the device's programming code and the reference programming code. If no abnormal code was detected, then the detection system may report a result of the security scan (e.g., the detection system may generate a data log or message to indicate that no abnormal code was detected), and then may proceed to step 150 and end the process. If abnormal code was detected in step 135, then in step 145, the detection system may report the finding and/or initiate steps to resolve the issue. For example, upon detecting abnormal code in a facial recognition camera, the detection system may generate a corresponding message, transmit the message to a system administrator, and power off the camera so that it may not be used until it is serviced.

Figure 2:
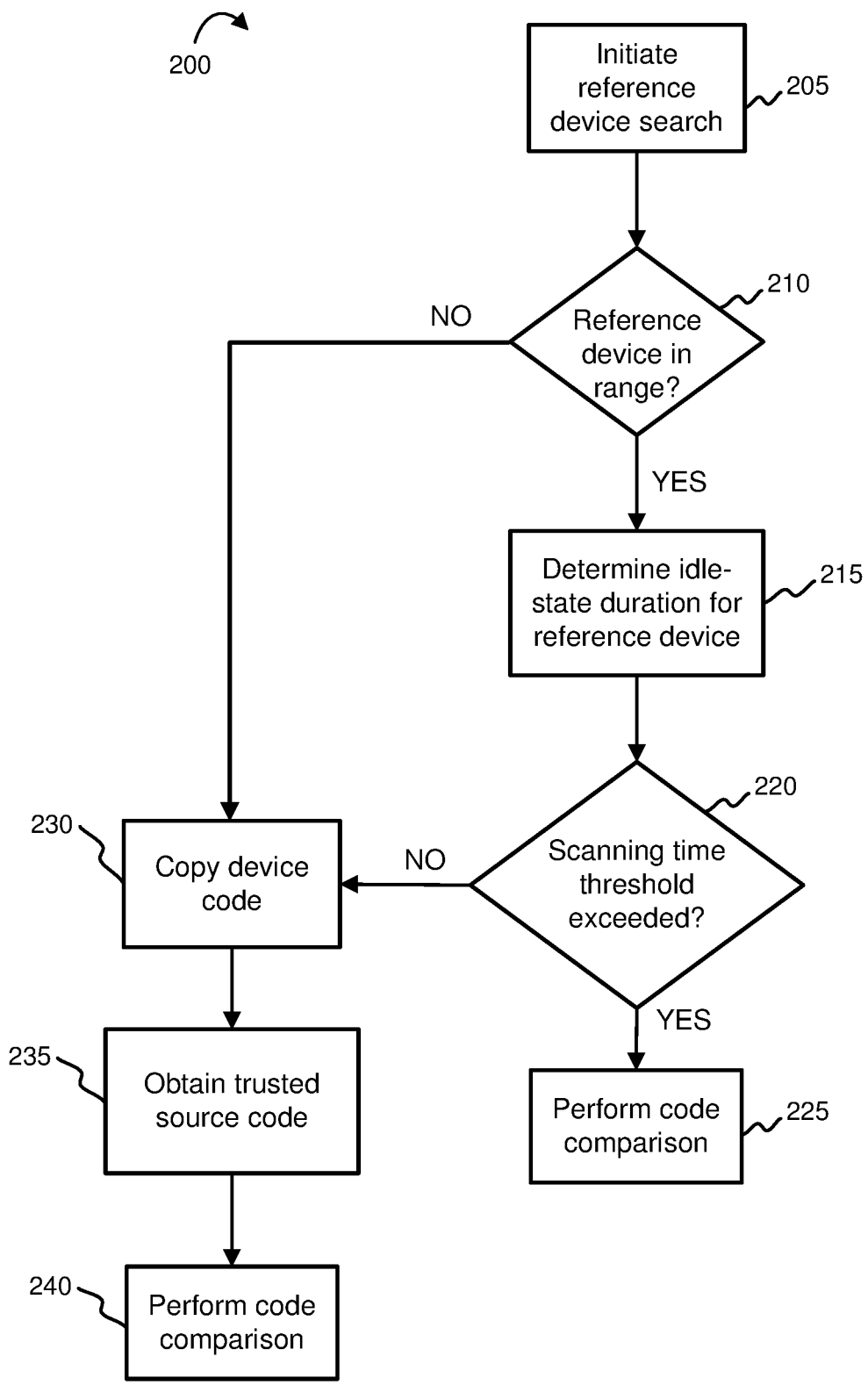
FIG. 2 depicts a flowchart of an example method for locating a reference programming code and performing a code comparison, in accordance with embodiments of the present disclosure.

FIG. 2 illustrates an example method 200 for performing a security scan in accordance with embodiments of the present disclosure. Method 200 may be activated, for example, when a detection system determines that a device is likely to be in an idle state for longer than a scanning-time threshold and that a device's available resources is above a processing threshold. In step 205, the detection system may initiate a search for a reference device. A reference device may be a device having a similar make and model to a device undergoing a security scan; the reference device may also provide a reference programming code that may be compared to the programming code of the device undergoing the security scan. The reference programming code may be a programming code that has not been subjected to a malicious computing attack or that has been recently validated; thus, it may aid in detecting abnormalities in the programming code to which it is compared. In step 205, the detection system may search for a reference device using wireless communication technology, such as vehicle-to-vehicle communication technology.

For example, in some embodiments, a non-autonomous first vehicle that includes a computing system and a detection system of the present disclosure may be parked at a local fitness facility. In step 205, the first vehicle's detection system may use wireless technology to search for a reference vehicle within a predetermined distance of the first vehicle. The reference vehicle searched for may be a vehicle that has a similar make and model to the first vehicle and that operates using a programming code that, according to the vehicle design, should be identical to that of the first vehicle.

In step 210, the detection system may determine whether a reference device is within a predetermined threshold distance of the device undergoing the security scan. For example, the detection system may require that a reference device be located within a 50-foot radius of the device undergoing a security scan so that the security scan may be performed reliably. If the detection system does not detect a reference device within the threshold distance, then the detection system may proceed to step 230. However, if a reference device is found within the threshold distance, then the detection system may proceed to step 215.

In step 215, the detection system may determine an idle-state duration for the reference device. Step 215 may include a processor of the detection system communicating with a processor of the reference device and obtaining an estimated idle-state duration for the reference device.

In step 220, the detection system may compare a scanning-time threshold of the device (see FIG. 1 discussion above) to the idle-state duration for the reference device. If the idle-state duration for the reference device does not exceed the scanning-time threshold in step 220, then the detection system may not have a sufficient amount of time to compare the programming code of the device undergoing the security scan to the programming code of the reference device. Thus, the detection system may proceed to step 230. However, if the idle-state duration of the reference device does exceed the scanning-time threshold in step 220, then the detection system may proceed to step 225 and perform a code comparison.

Continuing with the example discussed above, the detection system of the non-autonomous first vehicle parked at a local fitness facility may have detected a reference vehicle within the requisite threshold distance. In this example, the scanning detection system of the first vehicle may have estimated for the first vehicle a scanning-time threshold of 30 minutes. In step 215, the detection system of the first vehicle may communicate wirelessly with the reference vehicle and obtain an idle-state duration of 45 minutes for the reference vehicle. This idle-state duration of the second vehicle may indicate that the reference vehicle will remain parked in its current location for 45 minutes. Accordingly, in step 220, the detection system of the first vehicle may determine that the scanning-time threshold of 30 minutes has been exceeded; thus, a security scan may be performed because the first vehicle and the reference vehicle may remain within a sufficient distance of each other for a sufficient period of time to complete the security scan.

In step 225, the code comparison may include a processor of the detection system comparing each line of a programming code of a device undergoing a security scan to each line of a programming code of a reference device and detecting discrepancies between the two programming codes.

However, if the detection system determines in step 210 that there is no reference device in range, or in step 220 that the scanning time threshold has not been exceeded, the detection system may proceed to attempt to scan the device's programming code using other methods. For example, in step 230, the detection system may create a copy of the programming code used by the device that is undergoing a security scan. In step 235, the detection system may obtain a reference programming code from a trusted source. For example, in some embodiments, a detection system of an IoT camera may obtain a reference programming code via an Internet connection to the IoT camera manufacturer's web site. In step 240, the detection system may perform a code comparison, similar to that described above, between the scanned device's programming code and the reference programming code.

Figure 3:
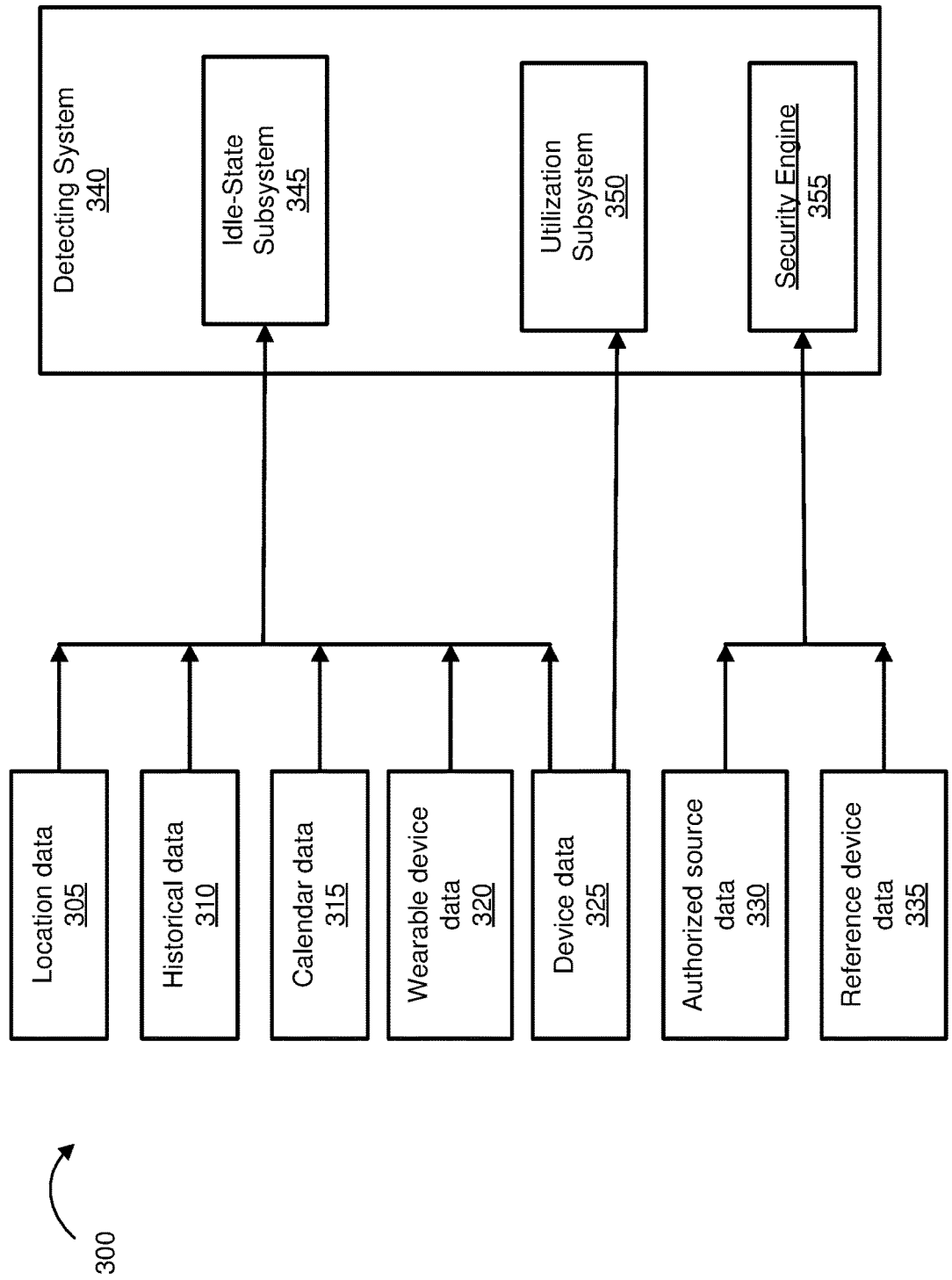
FIG. 3 depicts a system block diagram of a malicious code detection system, in accordance with embodiments of the present disclosure.

FIG. 3 illustrates a block diagram of an example system 300 according to an embodiment the present disclosure. System 300 may include one or more processors, such as the processor presented in FIG. 4, and/or neural networks. System 300 includes a detecting system 340. In some embodiments, the detecting system 340 may include an idle-state subsystem 345, a utilization subsystem 350, and a security engine 355. In some embodiments, the subsystems 345, 350, and 355 may not be discrete but may be integrated into the detecting system such that the detecting system 340 may perform all of the functions of subsystems 345, 350, and 355.

Idle-state subsystem 345 may perform functions such as detecting an idle state of a device, predicting an idle-state duration, estimating a scanning-time threshold, and determining whether the scanning-time threshold has been exceeded. In some embodiments, the idle-state subsystem 345 may receive location data 305, historical data 310, calendar data 315, wearable device data 320, and device data 325.

Location data 305 may include information about the location and/or movement of a device. Location data 305 may be provided by a source such as a device's GPS monitor. Historical data 310 may include one or more records that provide information about a use of the device or a location of the device with corresponding times and dates. Such data may be stored on a storage device of the detecting system. Calendar data 315 may include information such as a current time and date or future scheduled activities by a user. Such calendar data 315 may be obtained from a device such as a mobile phone of a user. Wearable device data 320 may include information about the use of a device such as a smart watch. Device data 325 may include information about the operation of a device, such as whether the ignition has been turned off or information about available processing capacity of a device.

In some embodiments, idle-state subsystem 345 may establish a device usage profile and/or a user profile to facilitate predicting an idle state of a device. For example, the idle-state subsystem 345 may obtain location data 305 from a vehicle GPS system that indicates that a vehicle is parked at a fitness center parking lot. The idle-state subsystem may also obtain calendar data 315 from a user mobile phone that indicates that it is currently 8:15 AM on a Tuesday and the user has scheduled swimming lessons from 8 AM to 9:30 AM on weekdays. The idle-state subsystem may also obtain wearable device data 320 that indicates that the user's smart watch is currently monitoring high fitness activity by the user. From this data, the idle-state subsystem 345 may establish a user profile indicating that the user has placed the vehicle in an idle state and will likely continue to do so from 8 AM to 9:30 AM on weekdays. Similarly, the idle-state subsystem may establish a device usage profile indicating that the vehicle will likely have an idle state from 8 AM to 9:30 AM on weekdays.

Utilization subsystem 350 may obtain device data 325. From device data 325, the utilization subsystem 350 may estimate a processing threshold value that represents a processing capacity of the device that would be required for the device to complete a security scan within a time period, such as within the scanning-time threshold. The utilization subsystem 350 may also determine a value corresponding to a device's available processing capacity for performing a security scan. Additionally, the utilization subsystem 350 may compare the value of a device's processing capacity with a processing threshold value.

Authorized source data 330 may include a device's programming code provided by an authorized source, such as the device manufacturer's website. Reference device data 335 may include information such as the make and model of the reference device, the programming code used by the reference device, an idle-state duration of the reference device, and a location of the reference device.

Security engine 355 may obtain authorized source data 330 and/or compatible device data 335 and perform functions such as searching for a reference device, determining whether the reference device satisfies requirements for performing a security scan, performing a security scan, reporting results of the security scan, and/or initiating a resolution action.

In some embodiments, the security engine 355 may maintain a database of known reference devices. A known reference device may be a reference device whose programming code has previously been compared to the device undergoing a security scan. By maintaining a database of known reference devices, the security engine 355 may quickly locate and initiate a security scan.

For example, in some embodiments, a first vehicle that operates using a first programming code may regularly be parked in an office parking lot near a second vehicle that operates using a second programming code. A security engine of the first vehicle may regularly perform a security scan using the second programming code as a reference programming code. In some embodiments, the security engine of the first vehicle may include identification information of the second vehicle in a known reference vehicle database. Using the known reference vehicle database, the security engine of the first vehicle may quickly recognize the second vehicle as a potential reference vehicle among other nearby vehicles and initiate a scan if the appropriate conditions are satisfied.

Figure 4:
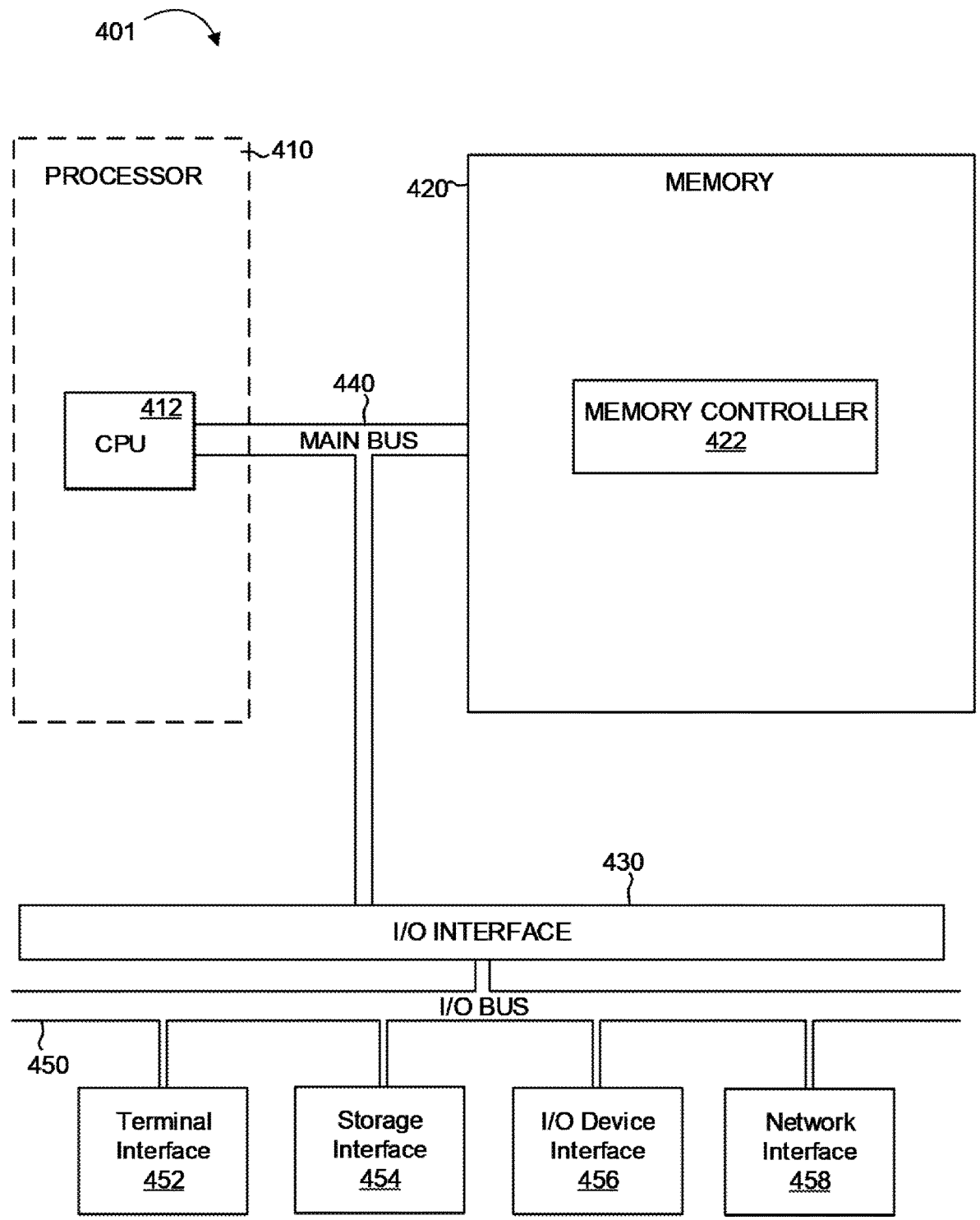
FIG. 4 depicts the representative major components of a computer system that may be used in accordance with embodiments of the present disclosure.

FIG. 4 depicts the representative major components of an exemplary Computer System 401 that may be used in accordance with embodiments of the present disclosure. The particular components depicted are presented for the purpose of example only and are not necessarily the only such variations. The Computer System 401 may comprise a Processor 410, Memory 420, an Input/Output Interface (also referred to herein as I/O or I/O Interface) 430, and a Main Bus 440. The Main Bus 440 may provide communication pathways for the other components of the Computer System 401. In some embodiments, the Main Bus 440 may connect to other components such as a specialized digital signal processor (not depicted).

The Processor 410 of the Computer System 401 may be comprised of one or more CPUs 412. The Processor 410 may additionally be comprised of one or more memory buffers or caches (not depicted) that provide temporary storage of instructions and data for the CPU 412. The CPU 412 may perform instructions on input provided from the caches or from the Memory 420 and output the result to caches or the Memory 420. The CPU 412 may be comprised of one or more circuits configured to perform one or methods consistent with embodiments of the present disclosure. In some embodiments, the Computer System 401 may contain multiple Processors 410 typical of a relatively large system. In other embodiments, however, the Computer System 401 may be a single processor with a singular CPU 412.

The Memory 420 of the Computer System 401 may be comprised of a Memory Controller 422 and one or more memory modules for temporarily or permanently storing data (not depicted). In some embodiments, the Memory 420 may comprise a random-access semiconductor memory, storage device, or storage medium (either volatile or nonvolatile) for storing data and programs. The Memory Controller 422 may communicate with the Processor 410, facilitating storage and retrieval of information in the memory modules. The Memory Controller 422 may communicate with the I/O Interface 430, facilitating storage and retrieval of input or output in the memory modules. In some embodiments, the memory modules may be dual in-line memory modules.

The I/O Interface 430 may comprise an I/O Bus 450, a Terminal Interface 452, a Storage Interface 454, an I/O Device Interface 456, and a Network Interface 458. The I/O Interface 430 may connect the Main Bus 440 to the I/O Bus 450. The I/O Interface 430 may direct instructions and data from the Processor 410 and Memory 420 to the various interfaces of the I/O Bus 450. The I/O Interface 430 may also direct instructions and data from the various interfaces of the I/O Bus 450 to the Processor 410 and Memory 420. The various interfaces may comprise the Terminal Interface 452, the Storage Interface 454, the I/O Device Interface 456, and the Network Interface 458. In some embodiments, the various interfaces may comprise a subset of the aforementioned interfaces (e.g., an embedded computer system in an industrial application may not include the Terminal Interface 452 and the Storage Interface 454).

Logic modules throughout the Computer System 401— including but not limited to the Memory 420, the Processor 410, and the I/O Interface 430—may communicate failures and changes to one or more components to a hypervisor or operating system (not depicted). The hypervisor or the operating system may allocate the various resources available in the Computer System 401 and track the location of data in Memory 420 and of processes assigned to various CPUs 412. In embodiments that combine or rearrange elements, aspects of the logic modules' capabilities may be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
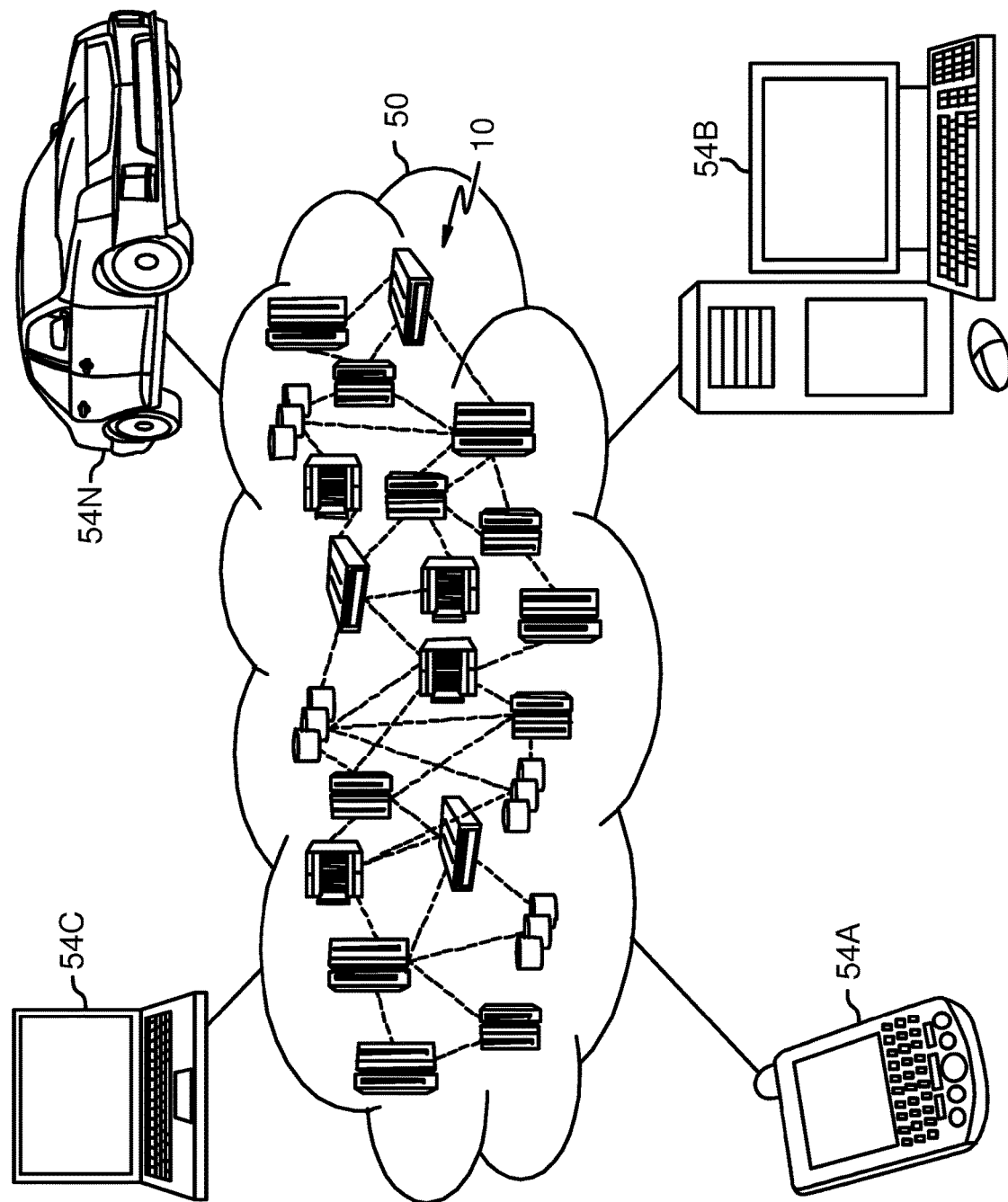
FIG. 5 depicts a cloud computing environment according to an embodiment of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
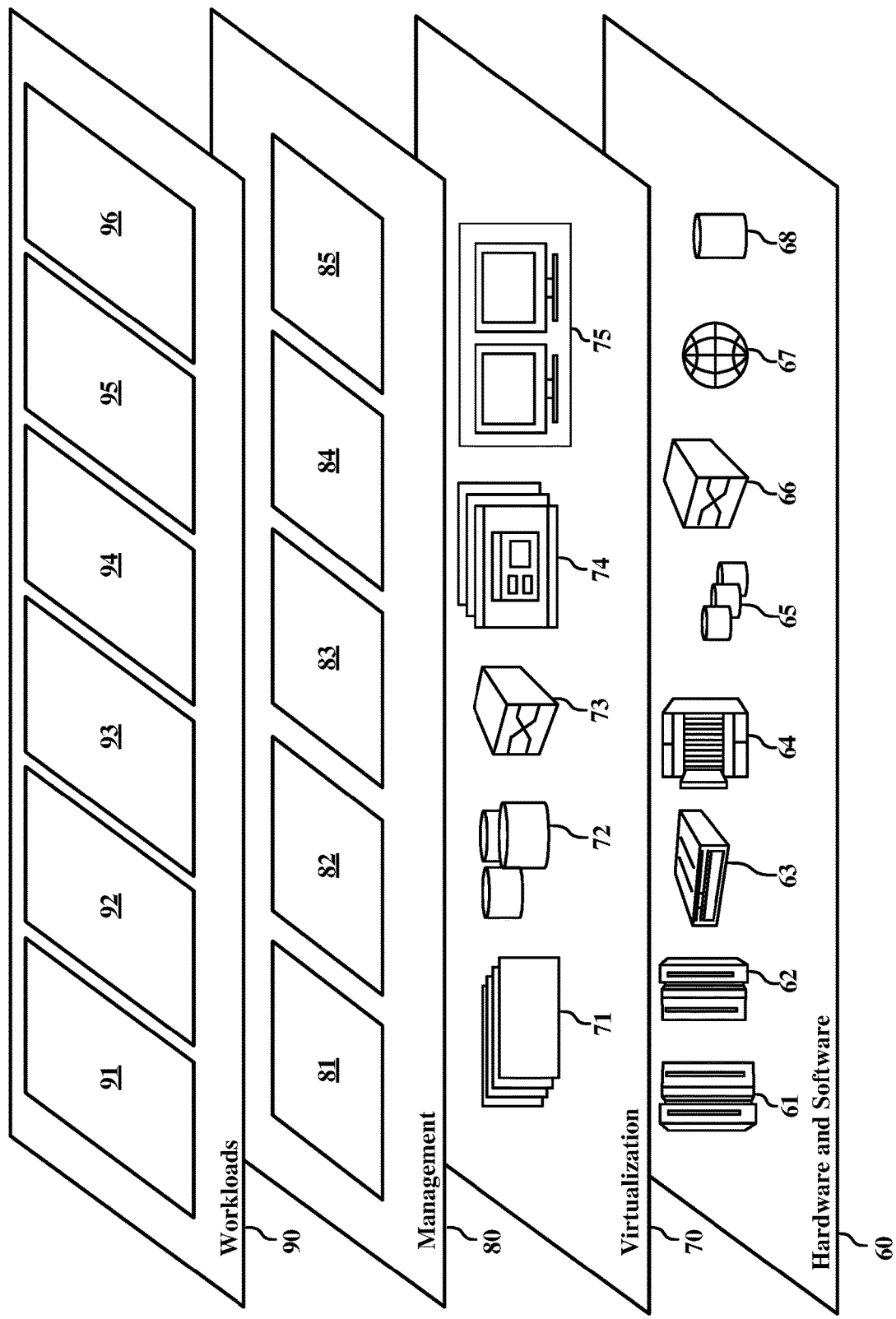
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and security scan logic 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method implemented by a computer including memory and a processor, the method comprising:
   Obtaining, by the computer, a predicted idle-state duration of a first device comprising a computing system of a first vehicle;

obtaining, by the computer, a threshold time to perform a security scan of the first device;

making, by the computer, a first determination that the predicted idle-state duration of the first device exceeds the threshold time;

obtaining, by the computer, a value corresponding to an available processing capacity of the first device;

obtaining, by the computer, a processing threshold value corresponding to a processing capacity to perform the security scan within the threshold time;

making, by the computer, a second determination that the value corresponding to the available processing capacity of the device exceeds the processing threshold value;

performing, by the computer, the security scan of the first device in response to the first determination and in response to the second determination, wherein the performing the security scan comprises:

locating, by the computer, a second vehicle within a threshold distance of the first vehicle;

obtaining, by the computer, an idle-state duration of the second vehicle;

making, by the computer, a third determination that the idle-state duration of the second vehicle exceeds the threshold time; and comparing, by the computer, and in response to the third determination, a first programming code of the first vehicle to a second programming code of the second vehicle.

2. The method of claim 1, wherein the predicted idle-state duration of the first device is based at least in part on a comparison between a first location of the first vehicle at a first time and a second location of the first vehicle at a second time.

3. The computer method of claim 1, wherein the predicted idle-state duration of the first device comprises a time period during which the first vehicle is parked.

4. The method of claim 1, further comprising: detecting that the first programming code includes a programming expression that is not present in the second programming code, and generating a message in response to the detecting.

5. The method of claim 1, wherein the idle-state duration of the second vehicle comprises a time period during which the second vehicle is parked.

6. A computer program product, the computer program product comprising a computer readable storage medium having program instructions embodied therewith, the program instructions executable by a computer to cause the computer to:

obtain a location of a first device comprising a computing system of a first vehicle;

obtain a location of a second device comprising a computing system of a second vehicle;

make a first determination that the second vehicle is located within a threshold distance of the first vehicle;

obtain a threshold time to perform a security scan of the first device;

obtain an idle-state duration of the second device, the idle-state duration comprising a time period during which the second vehicle is parked;

make a second determination that the idle-state duration exceeds the threshold time; and make a third determination to perform the security scan of the first device in response to the first determination and in response to the second determination.

7. The computer program product of claim 6, wherein the first device includes a first programming code; wherein the second device includes a second programming code; and wherein performing the security scan comprises comparing the first programming code to the second programming code.

8. The computer program product of claim 7, wherein the program instructions, when executed by the computer, further cause the computer to: detect that the first programming code includes a programming expression that is not present in the second programming code, and generate a message in response to the detecting.

9. A system comprising:
a processor; and
a memory in communication with the processor, the memory containing program instructions that, when executed by the processor, are configured to cause the processor to perform a method, the method comprising:
obtaining a predicted idle-state duration of a first device comprising a computing system of a first vehicle, the predicted idle-state duration comprising a time period during which the first vehicle is parked;
obtaining a value corresponding to an available processing capacity of the first device;
making a first determination that the predicted idle-state duration of the first device exceeds a time to perform a security scan of the first device using the available processing capacity of the first device; and
making a second determination to perform the security scan of the first device in response to the first determination,
wherein the performing the security scan comprises:
locating a second vehicle within a threshold distance of the first vehicle;
obtaining an idle-state duration of the second vehicle;
making a third determination that the idle-state duration of the second vehicle exceeds the threshold time; and
comparing, in response to the third determination, a first programming code of the first vehicle to a second programming code of the second vehicle.

10. The system of claim 9, wherein the predicted idle-state duration of the first device is based at least in part on a comparison between a first location of the first device at a first time and a second location of the first device at a second time.

11. The system of claim 9, wherein the predicted idle-state duration of the first device is based at least in part on historical data that indicates time periods of high activity by the first device and time periods of low activity by the first device.

12. The system of claim 9, wherein the method further comprises:
detecting that the first programming code includes a programming expression that is not present in the second programming code, and generating a message in response to the detecting.

13. The system of claim 9, wherein the idle-state duration of the second vehicle comprises a time period during which the second vehicle is parked.

* * * * *